United States Patent [19]
Rosen et al.

[11] Patent Number: 4,699,339
[45] Date of Patent: Oct. 13, 1987

[54] APPARATUS AND METHOD FOR TRANSPORTING A SPACECRAFT AND A FLUID PROPELLANT FROM THE EARTH TO A SUBSTANTIALLY LOW GRAVITY ENVIRONMENT ABOVE THE EARTH

[75] Inventors: Harold A. Rosen, Santa Monica; Alois Wittmann, Palos Verdes, both of Calif.

[73] Assignee: Hughes Aircraft Company, Los Angeles, Calif.

[21] Appl. No.: 707,278

[22] Filed: Mar. 1, 1985

[51] Int. Cl.⁴ .............................................. B64G 1/22
[52] U.S. Cl. ................................. 244/158 R; 244/160
[58] Field of Search .................. 244/158 R, 172, 160, 244/135 R; 222/386, 389, 399

[56] References Cited

U.S. PATENT DOCUMENTS 3,369,771  2/1968  Walley et al. ................. 244/162
3,923,208 12/1975  Bergloff ........................ 222/389
4,032,091  6/1977  Reddy ........................... 244/135 R
4,359,201 11/1982  Thomson et al. ............. 244/158 R
4,471,926  9/1984  Steel, III ....................... 244/158 R

OTHER PUBLICATIONS

Curtis Peebles, "Air-Launched Shuttle Concepts", Apr. 1983, vol. 36, pp. 153-155.

Primary Examiner—Galen Barefoot
Assistant Examiner—Lynn M. Fiorito
Attorney, Agent, or Firm—S. M. Mitchell; M. J. Meltzer; A. W. Karambelas

[57] ABSTRACT

An apparatus for transporting a spacecraft and fluid propellant from the earth to a substantially low gravity environment above the earth with substantially reduced loading of the spacecraft due to forces upon the fluid propellant during the transport, the apparatus including a vehicle for carrying the spacecraft and the fluid propellant from the earth to a substantially low gravity environment above the earth; a plurality of external tanks disposed within the vehicle, external to the spacecraft, for containing the fluid propellant as the vehicle carries the spacecraft and the fluid propellant from the earth to the substantially low gravity environment above the earth; a plurality of spacecraft tanks disposed within the spacecraft for receiving the fluid propellant and for containing the fluid propellant; and means for transferring the fluid propellant from the external tanks the spacecraft tanks in the substantially low gravity environment above the earth.

20 Claims, 5 Drawing Figures

APPARATUS AND METHOD FOR TRANSPORTING A SPACECRAFT AND A FLUID PROPELLANT FROM THE EARTH TO A SUBSTANTIALLY LOW GRAVITY ENVIRONMENT ABOVE THE EARTH

BACKGROUND OF THE INVENTION

1. Field of the invention

The invention relates generally to the transport of spacecraft from the earth to the relatively low gravity environment above the earth and more particularly to the transport of spacecraft and fluid propellant.

2. Description of the Related Art

A fundamental objective in designing and building spacecraft is to minimize the overall mass of the spacecraft. This is in part because the mass of the spacecraft is a significant factor in determining what proportion of a spacecraft cargo carried aloft should comprise propellant for manuevering the spacecraft once it has entered the relatively low gravity environment above the earth and what proportion may comprise electronic, optical or other systems.

For a typical spacecraft powered by a motor using a fluid propellant, for example, the propellant may comprise approximately 75% of the combined weight of the spacecraft and the propellant. A fluid propellant powered spacecraft launched from the space shuttle for geosynchronous orbit about the earth ordinarily requires enough propellant to propel the spacecraft from a relatively low parking orbit about the earth to a generally elliptical transfer orbit, to propel the spacecraft from a transfer orbit to a substantially circular geosynchronous orbit and to perform stationkeeping manuevers during the operational lifetime of the spacecraft.

In earlier spacecraft launches, fluid propellant usually was carried aloft within containers supported by support structure integral to the spacecraft. During launch from earth to the relatively low gravity environment above the earth, the rapid acceleration and vibration of the fluid propellant often resulted in loading of the propellant with forces equal to many times the force that the earth's gravity would exert on the propellant if it were at rest on the surface of the earth. Consequently, containers containing the propellant and support structure supporting it had to be sturdy enough to withstand such high loading. Unfortunately, sturdier containers and support structure generally were more massive. Thus, the containers and support structure of earlier spacecraft had to be massive and sturdy enough the withstand the high loading of the propellant during the launch.

In the past, a spacecraft often was staged to reduce its overall mass after it entered the relatively low gravity environment above the earth. For example, spacecraft were built which, during the transfer orbit, staged the spacecraft motor which propelled the spacecraft from the parking orbit to the transfer orbit.

While earlier schemes for reducing spacecraft mass by staging expendable spacecraft components generally were successful, there were shortcomings with their use. For example, staging usually necessitated the incorporation into the spacecraft of relatively complex systems used to accomplish the staging, and these systems often added to the mass of the spacecraft. Furthermore, there was an inherent risk that the staging would be unsuccessful and would leave the spacecraft disabled. Finally, much of the sturdy support structure used to support the fluid propellant during launch often was not easily separable from the spacecraft and, therefore, could not be staged.

Thus, there has been a need for an apparatus and a method for transporting a spacecraft and fluid propellant for use therein from the earth to a relatively low gravity environment above the earth without the need to incorporate into the spacecraft a support structure sturdy enough to support the fluid propellant during the transport. The present invention meets this need.

SUMMARY OF THE INVENTION

The present invention provides an apparatus and a method for transporting a spacecraft and fluid propellant from the earth to a substantially low gravity environment above the earth with substantially reduced loading of the spacecraft due to forces upon the fluid during the transport. An apparatus comprising the invention includes a vehicle for carrying the spacecraft and the fluid propellant from the earth to the low gravity environment above the earth. First means disposed within the vehicle, external to the spacecraft, is provided for containing the fluid propellant as the vehicle carries the spacecraft and the propellant from the earth to the substantially low gravity environment. Second means supported by spacecraft structure is provided for receiving and containing the fluid propellant. Third means is provided for transferring the fluid propellant from the first means to the second means in the substantially low gravity environment.

The method of the present invention comprises the step of placing the spacecraft and the fluid propellant in a vehicle for carrying the spacecraft and the propellant from the earth to a substantially low gravity environment above the earth, the propellant being placed in first means for containing the fluid, the first means being disposed external to the spacecraft. The method comprises the further step of transporting the spacecraft and the propellant from the earth to the substantially low gravity environment above the earth. The method comprises the further step of transferring the propellant from the first means to second means, supported by spacecraft structure, for containing the propellant.

The apparatus and method of the present invention permit the use of a spacecraft comprising reduced support structure mass. This is because the spacecraft support structure need not support the fluid propellant during launch from earth when accelerational, gravitational and vibrational forces may be exerted upon the propellant. Thus, a spacecraft is possible which, due to reduced support structure mass, more efficiently uses fluid propellant and which, therefore, may obviate the need for staging certain spacecraft components.

These and other features and advantages of the present invention will become more apparent from the following more detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which.

DESCRIPTION OF THE PREFERRED EMBODIMENT

The present invention provides a novel apparatus and method for transporting a spacecraft and fluid propellant from the earth to a relatively low gravity environment above the earth with substantially reduced loading of the spacecraft due to accelerational, gravitational, vibrational or other forces upon the fluid propellant during the transport. The following description is presented to enable any person skilled in the art to make and use the invention, and is presented in the context of a particular application and its requirements. Various modifications and improvements to the preferred embodiment will be readily apparent to those skilled in the art, and the generic principles herein may be applied to other embodiments and applications. Thus, the present invention is not intended to be limited to the embodiment shown, but it is to be accorded the widest scope consistent with the principles and features disclosed herein.

Figure 1:
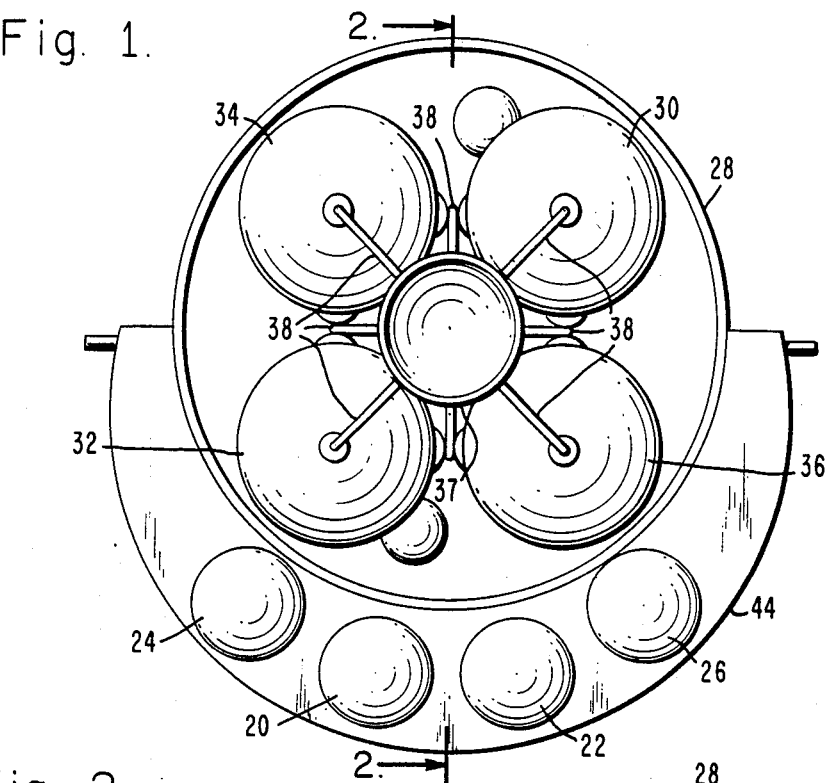
FIG. 1 is an end view of a preferred embodiment of the invention within a spacecraft and its supporting cradle.
Figure 2:
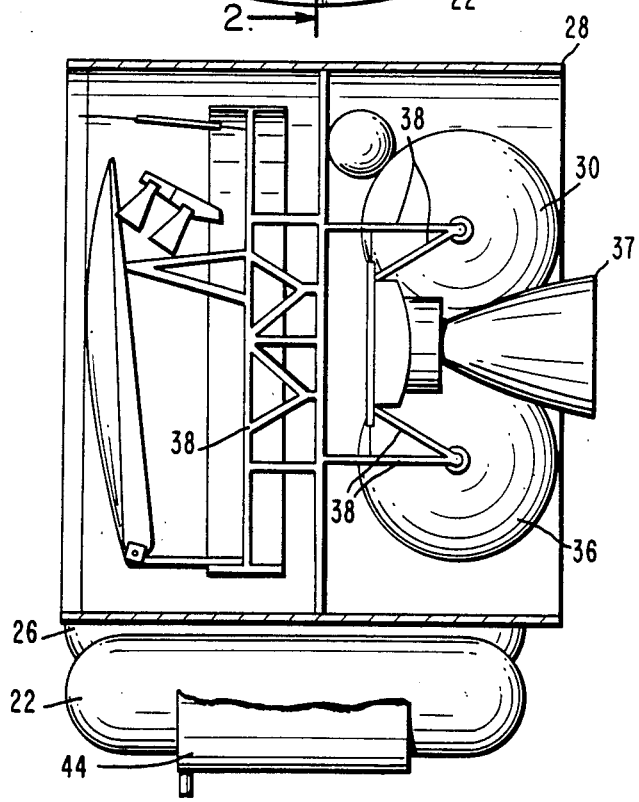
FIG. 2 is a longitudinal section view of the preferred embodiment taken along line 2—2 of FIG. 1.
Figure 3:
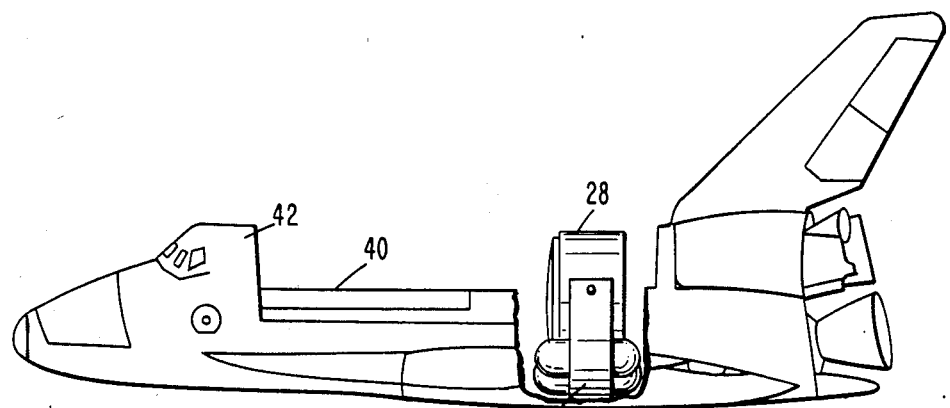
FIG. 3 is an elevated, partially fragmented side view of a space shuttle incorporating the preferred embodiment of FIGS. 1 and 2.

Referring to FIGS. 1 and 2, a preferred embodiment of an apparatus comprising the invention is shown. The apparatus comprises first, second, third and fourth tanks, 20, 22, 24 and 26, respectively, external to a spacecraft 28, for containing a fluid bipropellant for use by the spacecraft 28, and first, second, third and fourth spacecraft tanks, 30, 32, 34 and 36, respectively, supported by spacecraft support structure 38 in a manner which will be understood by those possessing skill in the art, for receiving the fluid bipropellant from the respective external tanks, 20, 22, 24 and 26. The spacecraft 28 and the external tanks are disposed within the cargo bay 40 of a space shuttle 42 as shown in FIG. 3.

The spacecraft 28 is secured within a generally U-shaped cradle 44 within the cargo bay 40, and the four external tanks, 20, 22, 24 and 26, are secured integral to the cradle 44 during the launch of the spacecraft 28 and the fluid bipropellant from the earth to the relatively low gravity environment above the earth.

Figure 4:
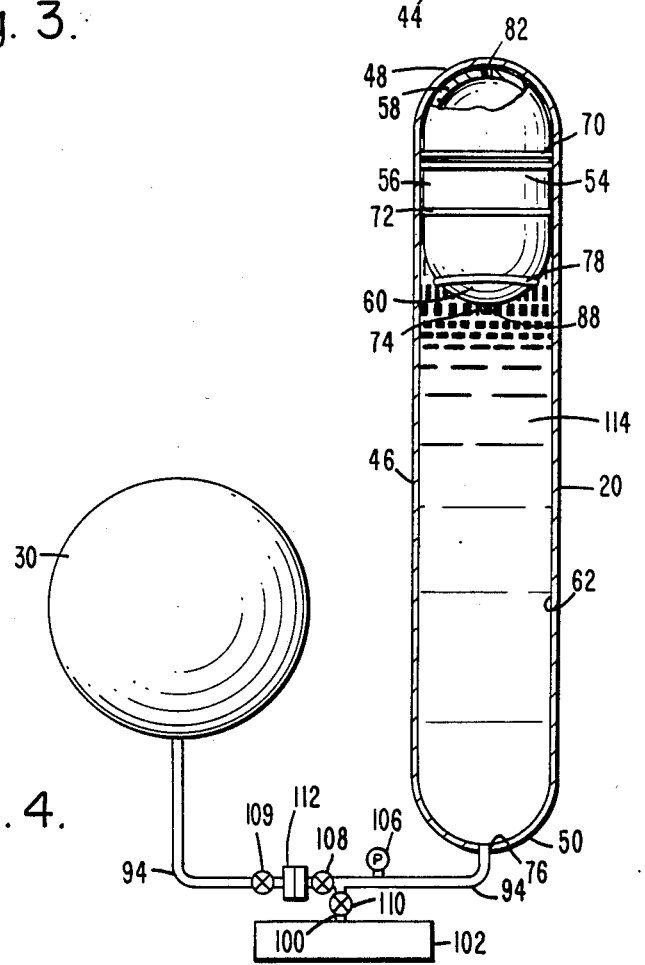
FIG. 4 is a diagramatic partially fragmented partial section view including a first external tank and a first spacecraft tank of the preferred embodiment wherein a piston is disposed in a first position prior to propellant transfer.
Figure 5:
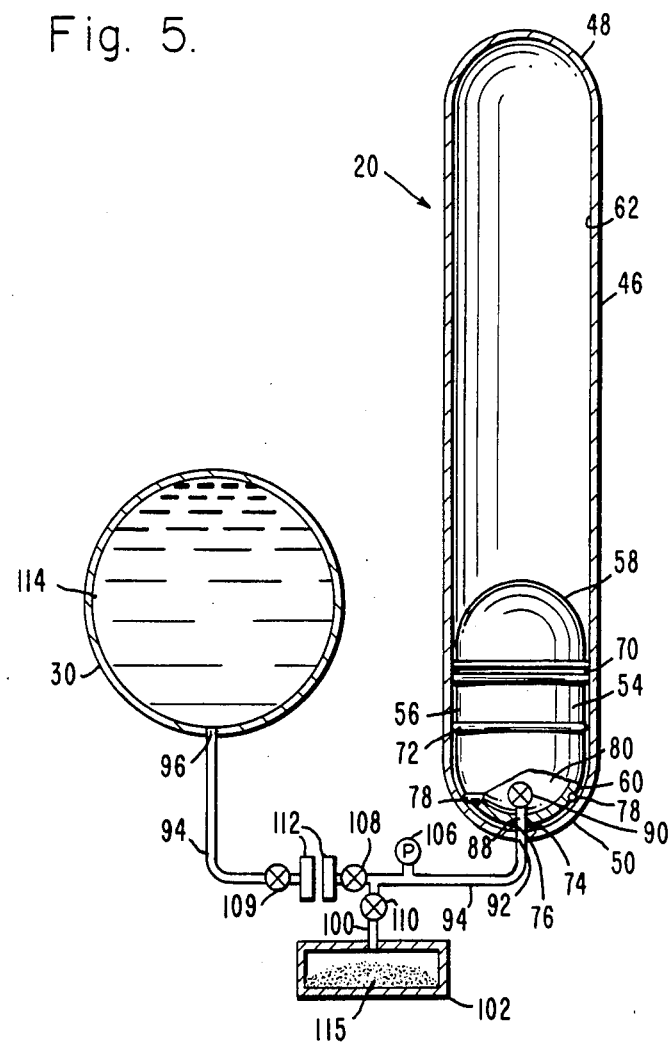
FIG. 5 is a diagramatic view as in FIG. 4 wherein the piston is in a second position after propellant transfer.

The four external tanks 20, 22, 24 and 26 are substantially identical as are the four spacecraft tanks 30, 32, 34 and 36. Thus, the exemplary drawings of the first external tank 20 and the first spacecraft tank 30 in FIGS. 4 and 5 are representative of the remaining external and spacecraft tanks. The first external tank 20 comprises a generally elongated cylindrical central section 46 and first and second longitudinally spaced substantially hemispherical end closures 48 and 50, respectively, for enclosing opposite ends of the central section 46. Referring once again to FIGS. 1 and 2, the external tanks, 20, 22, 24 and 26, are disposed about the U-shaped cradle 44 with their longitudinal axes aligned substantially parallel to one another and to the longitudinal axis of the U-shaped cradle 44.

The external tanks, 20, 22, 24 and 26, are laterally disposed with respect to one another within the cradle 44 in a generally semi-annular arrangement about the cradle 44. First and second external tanks, 20 and 22, respectively, are disposed adjacent to one another near the base of the U-shaped cradle, and third and fourth external tanks 24 and 26, respectively, are disposed with the first and second tanks 20 and 22, respectively, located substantially between them such that the first external tank 20 is between the second and third external tanks, 22 and 24, respectively, and the second external tank 22 is between the first and fourth external tanks 20 and 26, respectively. During the launch, the first and second external tanks 20 and 22, respectively, contain the lighter propellant component, a fuel, and a third and fourth external tanks 24 and 26, respectively, contain an oxidizer.

In the presently preferred embodiment, the four spacecraft tanks, 30, 32, 34 and 36, supported by spacecraft support structure 38 each have a substantially spherical shape and are disposed about a central axis of the spacecraft; such that the centers of the four spherical tanks lie in a common plane; such that the center of each tank is separated by approximately 90°, relative to the spacecraft central axis, from the centers of the tanks adjacent to it; and such that the center of each tank is substantially equidistant from the spacecraft central axis. First and second spacecraft tanks 30 and 32, respectively, are disposed with the spacecraft central axis between them, and third and fourth spacecraft tanks 34 and 36, respectively, also are disposed with the spacecraft central axis between them.

After the spacecraft 28 and the fluid bipropellant have reached the relatively low gravity environment above the earth, the fuel is transferred from the respective first and second external tanks 20 and 24 to the respective first and second spacecraft tanks 30 and 32 and the oxidize is transferred from the respective third and fourth external tanks 24 and 26 to the respective third and fourth spacecraft tanks 34 and 36 by means more fully described below.

One skilled in the art will appreciate that spacecraft support structure 38 (which forms no part of the present invention) used to support the spacecraft tanks, 30, 32, 34 and 36, need not support fluid bipropellant during launch from the earth to the relatively low gravity environment above the earth. This is because during that portion of the spacecraft mission, the fluid bipropellant is contained within the cradle-mounted external tanks, 20, 22, 24 and 26. Thus, the support structure 38 used to support the spacecraft tanks, 30, 32, 34 and 36, and the fluid bipropellant transferred to those tanks generally need only be sturdy enough to withstand the relatively low forces exerted upon the spacecraft tanks, 30, 32, 34 and 36, and the bipropellant therein the relatively low gravity environment above the earth such as acceleration loads generated by the spacecraft liquid propulsion motor 37. This can permit a reduction in the amount of spacecraft mass dedicated to support structure used to support the fluid bipropellant and a reduction in spacecraft complexity by obviating the need for the staging of certain spacecraft components.

Furthermore, one skilled in the art will appreciate that placing cylindrical external tanks, 20, 22, 24 and 26, about the U-shaped cradle 44 in the manner described makes efficient use of the limited space within the cargo bay 40, and that placing the spacecraft tanks, 30, 32, 34 and 36 about the central axis of the spacecraft 28 in the manner described helps to ensure that the spacecraft tanks, 30, 32, 34 and 36, and the fluid bipropellant transferred to those tanks are disposed about the spacecraft 28 in a balanced fashion such that the spacecraft 28 can rotate efficiently about its central axis after departing from the space shuttle 42.

The first external tank 20 as illustrated in FIGS. 4 and 5 substantially encloses a piston 54 slideably mounted therein to move substantially parallel to the longitudinal axis of the first external tank 20. The piston 54 comprises a cylindrical central section 56 and first and second substantially hemispherical piston end closures 58 and 60, respectively, for enclosing opposite ends of the central section 56. The central section 56 of the piston 54 is diametrically sized to fit in snug slideable relation with interior walls 62 of an elongated cylindrical external tank central section 46 and is longitudinally sized to be significantly shorter than the central section 46 of the first external tank 20. The first and second substantially hemispherical piston end closures 58 and 60, respectively, are diametrically sized to be complementary to the respective first and second hemispherical external tank end closures 48 and 50, respectively, such that, when the piston 54 is in a first position, illustrated in FIG. 4, the first piston end closure 58 overlays a concave interior of the first external tank end closure 48, and when the piston 54 is in a second position, illustrated in FIG. 5, the convex second piston end closure 60 overlays a concave interior of the second external tank end closure 50.

The piston comprises a guide 70 such as a piston ring which cooperates with the interior walls 62 of the external tank central section 46 to permit substantially rattle-free movement of the piston 54 between the first and second positions. The piston also includes a sliding seal 72 such as a spring energized wiper which maintains the tight fit between the piston 54 and the interior walls 62 as the piston 54 moves between the first and second positions. The sliding seal 72 substantially prevents the flow of fluid bipropellant between the piston 54 and the interior walls 62. Furthermore, the piston 54 includes means for providing a tight seal between a region about the apex 74 of the second piston end closure 60 and the region about the nadir 76 of the concave interior of the second external tank end closure 50 when the piston 54 is in the second position. The means for providing a seal, for example, can be an O-ring 78 formed from a propellant compatable elastomer which encircles the apex 74 of the second piston end closure 60.

The piston 54 defines a chamber suitable for containing a pressurant gas such as helium. The first piston end closure 58 defines a first piston outlet port 82 from the chamber at an apex of the first piston end closure 58. The first piston outlet port 82 permits pressurant gas flow during propellant expulsion.

The second piston end closure 60 defines a second piston outlet port 88 at the apex 74 of the second piston end closure 60. A first valve 90 is provided for closing the second piston outlet port 88 when the piston 54 is in the first position and for opening the second piston outlet port 88 when the piston 54 is in the second position. The first valve 90, for example, can be a mechanically actuated relief valve.

The second external tank end closure 60 defines an external tank outlet port 92 which opens into a first conduit defined by a first pipe 94 for carrying fluid between the external tank outlet port 92 and an inlet port 96 defined by the first spherical tank 30. A second conduit defined by a second pipe 100 for carrying fluid branches from the first conduit. The second conduit opens into a residue container 102 defining a chamber for receiving residual fluid bipropellant from the first conduit.

A fluid pressure sensor 106 is provided to monitor the fluid pressure within the first pipe 94.

Second and third valves 108 and 109, respectively, are provided for opening and closing the first conduit, and a fourth valve 110 is provided for opening and and a fourth valve 110 is provided for opening and closing the second conduit. The second, third and fourth valves 108, 109 and 110, respectively, are responsive to the fluid pressure sensor 106 in a manner which will be understood by a person skilled in the art.

A low spillage disconnect 112 is provided for disconnecting the first pipe 94 between the second and third valves 108 and 109. respectively, at a location between the third valve 109 and the external tank outlet port 92. The disconnect 112, for example, can be a quick disconnect type, actuated by force and released by pressure. The disconnect 112 is diagrammatically shown in a connected configuration in FIG. 4 and in a disconnected configuration in FIG. 5.

The operation of the preferred embodiment of the invention is explained in the following paragraphs.

During the launch of the spacecraft 28 and the fluid bipropellant from the earth to the relatively low gravity environment above the earth, each external tank, 20, 22, 24 and 26, contains a component 114 of the bipropellant, such as an oxidizer or a fuel. Referring to FIG. 4, the piston 54 is in the first position and the bipropellant component 114 is interposed between the second piston end closure 60 and the second external tank end closure 50. Meanwhile, the spacecraft tank 30 supported by the spacecraft support structure 38 is substantially evacuated. The piston 54 contains a pressurant gas such as helium. The pressure of the pressurant gas depends upon the particular needs of a launch, but a pressure of 100 pounds per square inch might be typical. The first, second, third and fourth valves, 90, 108, 109 and 110, respectively, are closed. Therefore, during the launch from the surface of the earth, the cradle 44 supports the external tank 20 and the bipropellant component 114 therein.

After the space shuttle 42 carrying the spacecraft 28 and the fluid bipropellant have reached a relatively low gravity environment above the earth, the bipropellant is transferred from the external tanks, 20, 22, 24 and 26, to the spacecraft tanks, 30, 32, 34 and 36. The transfer involves the step of opening the second and third valves, 108 and 109, respectively. Whereupon, the pressurant gas begins exiting through the first piston outlet port 82 and filling a region between the first piston end closure 58 and the first external tank end closure 48, driving the piston 54 from the first position, illustrated in FIG. 4, to the second position, illustrated in FIG. 5, and forcing the bipropellant component 114 through the external tank outlet port 92 through the first pipe 94 and through the inlet port 96 defined by the spacecraft tank 30.

The pressure sensor 106 measures the fluid pressure within the first pipe 94 as the bipropellant component 114 flows through the first pipe 94. As the second piston end closure 60 comes to rest with the O-ring 78 resting against and interior of the second external tank end closure 50, and substantially the last of the bipropellant component 114 exits from the external tank 20, the first valve 90 opens permitting pressurant gas to flow through the external tank outlet port 92 and into the first pipe 94. The pressure sensor 106 senses the drop of fluid flow as indicated by a drop of pressure in the first pipe 94 and causes the second and third valvee 108 and 109, respectively, to close the first conduit and causes the fourth valve 110 to open the second conduit. Thus, the relatively high pressure gas substantially flushes residual fluid bipropellant 115 from the first conduit through second conduit and into the residue container 102. Subsequently, the first and fourth valves 90 and 110, respectively, are closed by means which will be understood by those skilled in the art.

A person skilled in the art will appreciate that, when the second piston end closure 60 comes to rest adjacent to the interior of the second external tank end closure 50, the interposition of the O-ring 78 results in a relatively tight seal between the two end closures which substantially prevents the piston 54 from moving longitudinally within the external tank 20.

The passage of pressurant gas through the first and second pipes, 94 and 100, respectively, as described, substantially flushes residual fluid bipropellant 115 from the pipes, and, therefore, reduces the danger that bipropellant will leak into the shuttle cargo bay 40 following disconnect of the first conduit. The provision of a low leakage disconnect 112 further reduces such danger.

Of course, the discussion above relative to the exemplary first external 20 tank and first spacecraft tank 30 applies equally to the remaining external tanks, 22, 24 and 26, and spacecraft tanks, 32, 34 and 36. Each external tank, 20, 22, 24 and 26, has an associated spacecraft tank 30, 32, 34 and 36, respectively, to which it provides a bipropellant component. One will appreciate that this one-to-one relation between external tanks and spacecraft tanks simplifies the process of accurately distributing the fluid bipropellant components to the spacecraft tanks 20, 22, 24 and 26. Accurate distribution is important since an improper balancing of the bipropellant mass about the central axis of the spacecraft 28 might prevent the spacecraft 28 from spinning properly about its central axis.

Thus, the apparatus and method of the present invention permit the use of a spacecraft 28 comprising fluid propellant support structure 38 suitable for supporting a fluid propellant in the relatively low gravity environment above the earth, but not necessarily as sturdy and massive as would be necessary to support the fluid propellant during the launch from actual surface of the earth. Therefore, a spacecraft 28 comprising reduced support structure mass can be provided. Such a spacecraft 28 might be less massive and, therefore, require less propellant for manuevering and might obviate the need for staging cerain spacecraft components to reduce spacecraft mass.

Furthermore, the apparatus and method of the present invention provide for fluid propellant transfer without significant spillage of the fluid propellant in the space shuttle cargo bay 40. This is an important factor because fluid propellant often can be hazardous to humans and to equipment.

It is understood that the above-described of the invention is merely illustrative of many possible specific embodiments which can represent principles of the invention. Numerous and varied other arrangements can readily be devised in accordance with these principles by those skilled in the art without departing from the spirit and scope of the invention.

For example, the number of external tanks need not be the same as the number of spacecrafts tanks.

Furthermore, the external tanks need not include a piston for discharging a propellant. Instead, a bladder comprising an outlet port which opens into the first conduit may be provided, and the pressurant gas introduced to the external tank might compress the bladder and force the propellant from the bladder and into a spacecraft tank. Alternatively, an external tank may include a bellows comprising an outlet port which opens into the first conduit, and contraction of the bellows might force the propellant from the bellows into a spacecraft tank.

Finally, one skilled in the art will appreciate that, although the exemplary embodiment disclosed herein is adapted for use with a reuseable space shuttle, the basic principles of the invention are applicable for use with expendable launch vehicles as well.

Therefore, it is intended that the scope of the invention not be limited by the above description of an illustrative embodiment of the invention, but rather that the scope of the invention be defined by the appended claims in which:

What is claimed is:

1. An apparatus for transporting a spacecraft and fluid propellant from the earth to a substantially low gravity orbital environment above the earth, comprising:
   a vehicle for carrying said spacecraft and said fluid propellant from the earth to said substantially low gravity orbital environment above the earth;
   first means disposed within said vehicle, external to said spacecraft, for containing said fluid propellent as said vehicle carries said spacecraft and said fluid propellant from the earth to said substantially low gravity orbital environment above the earth;
   second means within said spacecraft for receiving said fluid propellant and for containing said fluid propellant;
   said second means being substantially empty of fluid propellant during transport of said spacecraft and said fluid propellant from the earth to said substantially low gravity orbital environment above the earth; and
   third means for transferring said fluid propellant from said first means to said second means in a substantially low gravity orbital environment above the earth.

2. An apparatus as in claim 1 wherein said second means comprises at least one spacecraft tank.

3. An apparatus as in claim 1 wherein said second means comprises a plurality of spacecraft tanks disposed about a central axis of the spacecraft.

4. An apparatus as in claim 1 wherein said second means comprises four spacecraft tanks disposed about a central axis of the spacecraft, each tank having a center disposed in a common plane, the center of each tank being separated by an angle of 90° from the centers of adjacent spacecraft tanks.

5. An apparatus as in claim 1 wherein said second means comprises at least one tank for receiving a fluid fuel and one tank for receiving a fluid oxidizer.

6. An apparatus as in claim 2 wherein said first means comprises a plurality of external tanks such that there is a spacecraft tank for each external tank.

7. An apparatus as in claim 1 wherein said first means comprises at least one external tank.

8. An apparatus as in claim 7 wherein at least one external tank is supported by a substantially U-shape cradle support structure which supports said spacecraft within said vehicle as said vehicle carries said spacecraft from the earth to said substantially low gravity environment above the earth.

9. An apparatus as in claim 8 wherein at least one external tank has a substantially cylindrical shape.

10. An apparatus for transporting a spacecraft and a fluid propellant from the earth to a substantially low gravity orbital environment above the earth comprising:
    a vehicle for carrying said spacecraft and said fluid propellant from the earth to said substantially low gravity orbital environment above the earth;
    at least one external tank disposed within said vehicle external to said spacecraft for containing said fluid propellant as said vehicle carries said spacecraft and said fluid propellant from the earth to said substantially low gravity orbital environment above the earth, said external tank defining an outlet port for passage of said fluid propellant;
    a plurality of spacecraft tanks within said spacecraft for receiving and containing said fluid propellant, each tank defining an inlet port for receiving said fluid propellant;
    said spacecraft tanks being substantially empty of fluid propellant during transport of said spacecraft and said fluid propellant from the earth to said substantially low gravity orbital environment above the earth; and
    means for transferring said fluid propellant from said external tank to at least one of said spacecraft tanks in said substantially low gravity orbital environment above the earth.

11. An apparatus as in claim 10 wherein said means for transferring comprises:
    a conduit between the inlet port of at least one spacecraft tank and the outlet port of said external tank.

12. An apparatus as in claim 11 wherein said means for transferring further comprises:
    a piston slideably mounted within said external tank such that said propellant fluid is disposed between said piston and the outlet port as said vehicle carries said spacecraft and said fluid propellant from the earth to said low gravity environment above the earth;
    first valve means for selectively opening and closing said conduit; and
    means for providing a pressurant gas, having a gas pressure substantially greater than a pressure within said external tank, such that said piston is disposed between said fluid propellant and said pressurant gas.

13. An apparatus as in claim 12 wherein said piston defines a chamber for containing said pressurant gas as said vehicle carries said spacecraft and said fluid propellant from the earth to said substantially low gravity environment above the earth.

14. An apparatus as in claim 12 and further comprising:
    sensing means for sensing when substantially all of said fluid propellant has been expelled from said external tank and for closing said first valve means upon sensing the completion of the expulsion.

15. An apparatus as in claim 14 wherein said sensing means includes means for measuring fluid pressure.

16. An apparatus as in claim 14 and further comprising:
    means for substantially removing residual fluid propellant from said conduit after the expulsion of said fluid propellant from said external tank.

17. An apparatus as in claim 11 and further comprising means for disconnecting, with substantially no spillage of fluid propellant, said conduit between said external tank and at least one spacecraft tank.

18. A method for transporting a spacecraft and fluid propellant from the earth to a substantially low gravity orbital environment above the earth, said method comprising the steps of:
    placing said spacecraft and said fluid propellant in a vehicle for carrying said spacecraft and said fluid propellant from the earth to said substantially low gravity orbital environment above the earth, said fluid propellant being placed in first means for containing said fluid propellant, said first means being disposed external to said spacecraft;
    carrying said spacecraft and said first means containing said fluid propellant from the earth to a substantially low gravity orbital environment above the earth; and
    transferring said fluid propellant from said first means to second means, within said spacecraft, for containing said fluid propellant, said second means being substantially empty of fluid propellant during transport of said spacecraft and said fluid propellant from the earth to said substantially low gravity orbital environment above the earth.

19. A method as in claim 18 wherein the step of transferring further comprises the step of:
    transferring said fluid propellant through a conduit from said first means to said second means.

20. A method as defined in claim 19 and further including the step of:
    discharging residual fluid propellant from said conduit after said step of transferring.

* * * * *